Patented June 5, 1934

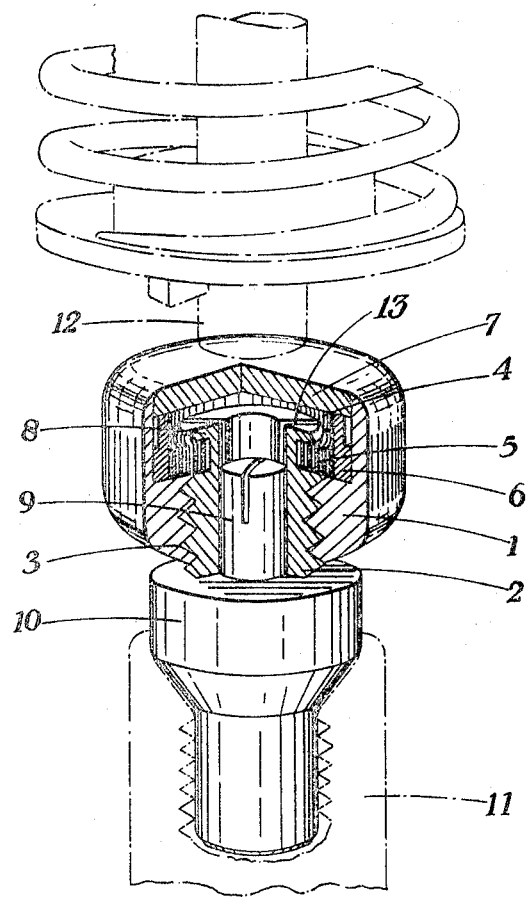

1,962,057

UNITED STATES PATENT OFFICE 1,962,057

SELF-ADJUSTING TAPPET DEVICE

Cyril Leonard Frederick Clutterbuck,
London, England

Application March 16, 1933, Serial No. 661,058
In Great Britain March 11, 1932

3 Claims. (Cl. 123—90)

This invention relates to an improved self-adjusting tappet device, of the type in which two relatively movable members engage by means of a screw thread, and having spring restoring means which serve to extend the device against the coacting faces between which it is fitted.

The present invention relates particularly to the construction and fitting of the spring restoring means, and has for its object to overcome various difficulties and deficiencies which have been encountered in the models as previously constructed. Among these disadvantages are the facts that the springs are liable to unscrew one member from the other when examining the device and so to put it out of gear. In the event of a sticky valve it sometimes happens that the main member comes apart from the outer casing. It is further a matter of some difficulty correctly to assemble the devices.

According to the present invention, a self-adjusting tappet device consisting of a male member co-acting with a female or housing member by means of a suitable screw thread, has a volute spring of flat or ribbon section, tending to move the members relatively to one another, located within the female member and engaging with both members. A hardened disc of steel or like material is then secured in place above the spring and retains the latter in place and serves as a bearing surface for the valve stem or like member.

The invention will now be described with reference to the accompanying drawing, showing the device in perspective with a portion broken away.

The members 1 and 2 are respectively female and male members which are respectively internally and externally threaded at 3 for interengagement with one another. A chamber 4 formed in the female member 1 houses a volute spring 5 and a friction collar 6. This chamber is closed at its outer or upper end by a hardened steel plate 7 and is preferably milled on the outside. The inner end of the volute spring 5 is secured to the male member 2, for example, by being fitted into a slot 13 therein, and the outer end to the split collar 6 which is held frictionally in the chamber 4. In assembling the device the male member 2, with the spring 5 and collar 6 connected thereto, is inserted through the open end of the chamber 4. The collar 6 is then turned until the spring is tensioned sufficiently to ensure that the member 2 protrudes to the required extent beyond the member 1. This position is reached when the spring 5 engaging with a flange 8 on the member 2, bears against the bottom of the chamber 4, as shown, and thus prevents further outward movement of the member 2. The collar 6 engages frictionally in the chamber 4 and after the member 2 has been brought into the required position the collar is turned to increase the tension of the spring so that it always tends to screw the member 2 outwardly.

The hardened plate 7 is then fitted into the open end of the chamber 4 so as to close the latter and is preferably held in position by turning over or upsetting the outer edge of the member 1 as shown.

The member 2 is made hollow so as to receive a head 9 of an adapter member 10 which in turn engages with a recess in the tappet head 11. This recess normally receives a tappet screw which, however, is removed from the tappet as it is not required when the self-adjusting tappet device according to the invention is being used. It will be appreciated that the dimensions of tappets as fitted to various engines vary and, therefore, it is convenient to provide the adapter member 10 as shown. The head 9 of the member 10 is adapted to fit tightly a standardized self-adjusting tappet device, and which may itself be modified in accordance with various designs of tappets. The head 9 is preferably formed of spring steel and has a slot at its upper end so as to enable it to be sprung tightly into the member 2. The remainder of the adapter member is preferably made of mild steel. The valve stem 12 bears against the steel plate 7. The device could, of course, be inverted if required, but the construction as described forms a convenient method of readily adapting the device to various designs of engines and keeping the working parts clean.

The device above described for fitting between a tappet and valve stem has the member 2 screwed into the female member 3 so that the outer faces of these two members are flush with one another. In this condition the device fitted with the adapter member 10 is placed between the valve stem and tappet, with the adapter member engaging with the recess in the tappet head 11. There should now be a clearance of about .025" between the plate 7 and the bottom of the valve stem 12. Should this clearance not be available the length of the valve stem is reduced by filing or grinding or both. If the clearance is too large washers are placed between the member 2 and the adapter member 10. The spring 5 by expanding then screws the member 2 outwardly from the member 3 so as to take up any clearance.

The pitch of the screw threads 3 is such that sudden compression shocks are transmitted from one member to the other by reason of the locking of the screw threads, whereas a gradual compression tends to make one member screw into the other. Under vibration the spring serves to unscrew one member from the other to take up wear, and to compensate for expansion of the valve stem due to heat when the engine is running.

It will, therefore, be appreciated that if the male member is deliberately unscrewed, the volute spring will tend to expand within its cylindrical housing and will offer very considerable resistance to further movement once its turns are compressed flat against the wall of the housing. The outer end of the spring 5 may be secured by engaging it with a slot in the wall of the chamber. Such a device is extremely easy to assemble, since the hardened contact disc may rest upon an annular shoulder in the housing extension and may be secured in position by clinching in the outstanding edges of the housing, or by other known methods, such as, screwing it into position and securing it by means of grub screws or other securing means.

I claim:—

1. A self-contained, self-adjusting distance piece of the class described, adapted for insertion between two members to transmit therebetween an axial load, said distance piece comprising interengaging male and female worm threaded elements adapted to contact respectively with the aforesaid members, said female element having at one end thereof an internally threaded opening and at the other end a recess so as to form a chamber therein, said chamber being of larger diameter than said threaded opening, said male element engaging said opening and having a portion thereof extending into said chamber, a collar located in said chamber, said collar surrounding in spaced relation the portion of the male element located in said chamber, said collar frictionally engaging with said female element, and a volute spring of flat section surrounding the portion of the male element located in said chamber, said spring being attached at one end to said male element and at the other end to said collar, said collar by relative rotation in said female element serving to adjust the tension of said spring, said spring normally tending to move said elements axially relatively to one another in a direction opposite that in which movement was imparted thereto under a gradually applied axial load.

2. A self-contained, self-adjusting distance piece of the class described, adapted for insertion between two members to transmit therebetween an axial load, said distance piece comprising interengaging male and female worm threaded elements adapted to contact respectively with the aforesaid members, said female element having at one end thereof an internally threaded opening and at the other end a recess so as to form a chamber therein, said chamber being of larger diameter than said threaded opening, said male element engaging said opening and having a portion thereof extending into said chamber, a split collar located in said chamber, the portion of said male element extending into said chamber having a slit therein, said collar being arranged in spaced relation around the portion of the male element in said chamber and being in frictional engagement with said chamber, and a volute spring of flat section located in the space between said male portion and said collar, said spring having one end thereof engaging the slit in the said male portion and its other end engaging between the ends of the collar, said collar by relative rotation in said female element serving to adjust the tension of said spring, said spring normally tending to move said elements relatively to one another counter to the direction in which they are moved by a gradually applied axial load.

3. A self-contained, self-adjusting distance piece of the class described, adapted for insertion between two members to transmit therebetween an axial load, said distance piece comprising interengaging male and female worm threaded elements adapted to contact respectively with the aforesaid members, said female element having a bore of two different diameters, the bore of smaller diameter being screw threaded and receiving the male element, the bore of larger diameter forming a chamber, a plate closing the outer end of said chamber, a portion of said male element extending into said chamber, a split collar located in said chamber, said collar surrounding in spaced relation the portion of the male element located in said chamber, said collar frictionally engaging with said female element, and a volute spring of flat section surrounding the portion of the male element located in said chamber, said spring being attached at one end to said male element and at the other end to said collar, said collar by relative rotation in said female element serving to adjust the tension of said spring, said spring normally tending to move said elements relatively to one another counter to the direction in which they are moved by a gradually applied axial load.

CYRIL LEONARD
FREDERICK CLUTTERBUCK.